(12) United States Patent
Xue et al.

(10) Patent No.: US 9,728,184 B2
(45) Date of Patent: Aug. 8, 2017

(54) RESTRUCTURING DEEP NEURAL NETWORK ACOUSTIC MODELS

(71) Applicant: Microsoft Technology Licensing, LLC, Redmond, WA (US)

(72) Inventors: Jian Xue, Redmond, WA (US); Emilian Stoimenov, Bellevue, WA (US); Jinyu Li, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/920,323

(22) Filed: Jun. 18, 2013

(65) Prior Publication Data
US 2014/0372112 A1      Dec. 18, 2014

(51) Int. Cl.
| | | |
|---|---|---|
| *G10L 15/00* | (2013.01) | |
| *G10L 15/16* | (2006.01) | |
| *G06N 3/04* | (2006.01) | |
| *G06N 3/08* | (2006.01) | |
| *G10L 15/14* | (2006.01) | |

(52) U.S. Cl.
CPC ............ *G10L 15/16* (2013.01); *G06N 3/0454* (2013.01); *G06N 3/084* (2013.01); *G10L 15/142* (2013.01)

(58) Field of Classification Search
CPC .............................. G10L 15/142; G10L 15/16
USPC ......... 704/202, 232, 246, 251, 256, E15.036
See application file for complete search history.

(56) References Cited

U.S. PATENT DOCUMENTS

| | | |
|---|---|---|
| 6,167,377 A | 12/2000 | Gillick et al. |
| 6,185,528 B1 | 2/2001 | Fissore et al. |
| 6,263,308 B1 | 7/2001 | Heckerman |
| 6,970,947 B2 | 11/2005 | Ebling et al. |
| 7,729,902 B1 | 6/2010 | Gupta |
| 7,835,910 B1 | 11/2010 | Hakkani-Tur et al. |

(Continued)

FOREIGN PATENT DOCUMENTS

| | | |
|---|---|---|
| CN | 1622646 | 6/2005 |
| CN | 1830025 | 9/2006 |

(Continued)

OTHER PUBLICATIONS

Chandrasekaran, et al., "Sparse and Low-Rank Matrix Decompositions," IFAC Symposium on System Identification, 2009.*

(Continued)

*Primary Examiner* — Pierre-Louis Desir
*Assistant Examiner* — Forrest F Tzeng

(57) ABSTRACT

A Deep Neural Network (DNN) model used in an Automatic Speech Recognition (ASR) system is restructured. A restructured DNN model may include fewer parameters compared to the original DNN model. The restructured DNN model may include a monophone state output layer in addition to the senone output layer of the original DNN model. Singular value decomposition (SVD) can be applied to one or more weight matrices of the DNN model to reduce the size of the DNN Model. The output layer of the DNN model may be restructured to include monophone states in addition to the senones (tied triphone states) which are included in the original DNN model. When the monophone states are included in the restructured DNN model, the posteriors of monophone states are used to select a small part of senones to be evaluated.

20 Claims, 12 Drawing Sheets

(56) References Cited

U.S. PATENT DOCUMENTS

| | | | |
|---|---|---|---|
| 8,015,006 | B2 | 9/2011 | Kennewick et al. |
| 8,229,729 | B2 | 7/2012 | Sarikaya et al. |
| 8,275,615 | B2 | 9/2012 | Kozat |
| 8,296,107 | B2 | 10/2012 | Turner et al. |
| 8,321,220 | B1 | 11/2012 | Chotimongkol et al. |
| 8,326,634 | B2 | 12/2012 | Di Cristo et al. |
| 8,346,563 | B1 | 1/2013 | Hjelm et al. |
| 8,400,332 | B2 | 3/2013 | Szwabowski et al. |
| 8,412,521 | B2 | 4/2013 | Mathias et al. |
| 8,571,866 | B2 | 10/2013 | Melamed et al. |
| 9,311,298 | B2 | 4/2016 | Sarikaya et al. |
| 9,324,323 | B1 | 4/2016 | Bikel et al. |
| 2002/0083041 | A1* | 6/2002 | Achlioptas .............. G06F 17/16 |
| 2002/0116171 | A1 | 8/2002 | Russell |
| 2003/0125948 | A1 | 7/2003 | Lyudovyk |
| 2003/0212543 | A1 | 11/2003 | Epstein |
| 2003/0212544 | A1 | 11/2003 | Acero |
| 2004/0088726 | A1 | 5/2004 | Ma et al. |
| 2005/0065789 | A1 | 3/2005 | Yacoub |
| 2005/0091057 | A1 | 4/2005 | Phillips et al. |
| 2005/0144013 | A1 | 6/2005 | Fujimoto et al. |
| 2005/0165598 | A1 | 7/2005 | Cote et al. |
| 2006/0287856 | A1 | 12/2006 | He et al. |
| 2007/0038436 | A1 | 2/2007 | Cristo et al. |
| 2007/0128979 | A1 | 6/2007 | Shackelford |
| 2007/0150428 | A1* | 6/2007 | Webb ...................... G06N 5/04 706/46 |
| 2007/0156392 | A1 | 7/2007 | Balchandran et al. |
| 2007/0203863 | A1 | 8/2007 | Gupta |
| 2007/0226649 | A1 | 9/2007 | Agmon |
| 2007/0271086 | A1 | 11/2007 | Peters et al. |
| 2008/0004877 | A1 | 1/2008 | Tian |
| 2008/0195388 | A1 | 8/2008 | Bower et al. |
| 2008/0215183 | A1 | 9/2008 | Chen |
| 2008/0235017 | A1 | 9/2008 | Satomura |
| 2009/0030697 | A1 | 1/2009 | Cerra et al. |
| 2009/0292687 | A1 | 11/2009 | Fan |
| 2010/0004930 | A1 | 1/2010 | Strope |
| 2010/0114890 | A1* | 5/2010 | Hagar ............... G06F 17/30731 707/737 |
| 2010/0128863 | A1 | 5/2010 | Krum et al. |
| 2010/0211695 | A1 | 8/2010 | Steinmetz et al. |
| 2010/0312546 | A1 | 12/2010 | Chang et al. |
| 2011/0010171 | A1* | 1/2011 | Talwar .................. G10L 17/02 704/233 |
| 2011/0093459 | A1 | 4/2011 | Dong et al. |
| 2011/0144999 | A1 | 6/2011 | Jang et al. |
| 2011/0153324 | A1 | 6/2011 | Ballinger et al. |
| 2011/0296374 | A1 | 12/2011 | Wu et al. |
| 2012/0065976 | A1 | 3/2012 | Deng |
| 2012/0084086 | A1 | 4/2012 | Gilbert |
| 2012/0232885 | A1 | 9/2012 | Barbosa et al. |
| 2012/0245944 | A1 | 9/2012 | Gruber |
| 2012/0253799 | A1 | 10/2012 | Bangalore |
| 2012/0253802 | A1 | 10/2012 | Heck et al. |
| 2012/0254086 | A1 | 10/2012 | Deng |
| 2012/0254227 | A1 | 10/2012 | Heck et al. |
| 2012/0265531 | A1 | 10/2012 | Bennett |
| 2012/0271617 | A1 | 10/2012 | Nakajima et al. |
| 2012/0290293 | A1 | 11/2012 | Hakkani-Tur et al. |
| 2012/0303565 | A1 | 11/2012 | Deng et al. |
| 2013/0031476 | A1 | 1/2013 | Coin et al. |
| 2013/0085756 | A1 | 4/2013 | Chotimongkol et al. |
| 2013/0138436 | A1 | 5/2013 | Yu |
| 2013/0152092 | A1 | 6/2013 | Yadgar |
| 2013/0185065 | A1 | 7/2013 | Tzirkel-Hancock et al. |
| 2013/0325148 | A1* | 12/2013 | Mustafa ............... G05B 13/048 700/31 |
| 2014/0025380 | A1 | 1/2014 | Koch et al. |
| 2014/0214410 | A1 | 7/2014 | Jang |
| 2014/0257803 | A1 | 9/2014 | Yu et al. |
| 2014/0358537 | A1 | 12/2014 | Gilbert |
| 2014/0379326 | A1 | 12/2014 | Sarikaya et al. |
| 2014/0379353 | A1 | 12/2014 | Boies et al. |
| 2015/0100312 | A1 | 4/2015 | Bocchieri |
| 2015/0161993 | A1 | 6/2015 | Sainath |
| 2015/0161994 | A1 | 6/2015 | Tang |
| 2015/0170020 | A1* | 6/2015 | Garimella .............. G06N 3/082 706/14 |
| 2015/0255061 | A1 | 9/2015 | Xue et al. |
| 2015/0255069 | A1 | 9/2015 | Adams |
| 2015/0278191 | A1 | 10/2015 | Levit et al. |
| 2015/0310858 | A1 | 10/2015 | Li et al. |
| 2015/0325236 | A1 | 11/2015 | Levit et al. |
| 2016/0203125 | A1 | 7/2016 | Sarikaya et al. |
| 2017/0103753 | A1 | 4/2017 | Levit et al. |
| 2017/0162201 | A1 | 6/2017 | Boies et al. |

FOREIGN PATENT DOCUMENTS

| | | |
|---|---|---|
| CN | 101415039 | 4/2009 |
| CN | 102737099 | 10/2012 |
| CN | 102792320 | 11/2012 |
| EP | 0553101 B1 | 7/1997 |
| EP | 2575128 A2 | 4/2013 |
| JP | 2002/091477 A | 3/2002 |
| KR | 20130022513 | 3/2013 |
| WO | 2005/013262 A1 | 2/2005 |
| WO | 2013/171481 A2 | 11/2013 |

OTHER PUBLICATIONS

Dahl et al., "Context-Dependent Pre-Trained Deep Neural Networks for Large-Vocabulary Speech Recognition," IEEE Trans. Audio, Speech and Language Processing, Jan. 2012.*

Lilly, et al., "Robust Speech Recognition Using Singular Value Decomposition Based Speech Enhancement," IEEE TENCON, 1997.*

Abid, et al., "A New Neural Network Pruning Method Based on the Singular Value Decomposition and the Weight Initialisation", In Proceedings of 11th European Signal Processing Conference, Sep. 3, 2002, 4 pages.

Abad, et al., "Context Dependent Modelling Approaches for Hybrid Speech Recognizers", In Proceeding of INTERSPEECH, Sep. 26, 2010, 4 pages.

Hinton, et al., "Deep Neural Networks for Acoustic Modeling in Speech Recognition", In IEEE Signal Processing Magazine, vol. 29, Issue 6, Nov. 2012, 27 pages.

Dahl, et al., "Context-Dependent Pre-trained Deep Neural Networks for Large Vocabulary Speech Recognition", In Journal of IEEE Transactions on Audio, Speech, and Language Processing, vol. 20, Issue 1, Jan. 2012, 13 pages.

Yu, et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.

Seide, et al., "Conversational Speech Transcription using Context-Dependent Deep Neural Networks", In Proceeding of 12th Annual Conference of the International Speech Communication Association, Aug. 28, 2011, 4 pages.

Jaitly, et al., "Application of Pretrained Deep Neural Networks to Large Vocabulary Conversational Speech Recognition", In Technical Report (UTML TR 001), Department of Computer Science, Mar. 12, 2012, 11 pages.

Sainath, et al., "Making Deep Belief Networks Effective for Large Vocabulary Continuous Speech Recognition", In Proceeding of IEEE Workshop on Automatic Speech Recognition and Understanding, Dec. 11, 2011, 6 pages.

Dahl, et al., "Large Vocabulary Continuous Speech Recognition with Context-Dependent DBN-HMMs", In Proceeding of IEEE International Conference on Acoustics, Speech and Signal Processing, May 22, 2011, 4 pages.

Mohamed, et al., "Acoustic Modeling Using Deep Belief Networks", In Journal of IEEE Transactions on Audio, Speech, and Language Processing, vol. 20, Issue 1, Jan. 2012, 9 pages.

Yu, et al., "Improved Bottleneck Features Using Pretrained Deep Neural Networks", In Proceeding of 12th Annual Conference of the International Speech Communication Association, Aug. 28, 2011, 4 pages.

(56) References Cited

OTHER PUBLICATIONS

Sainath, et al., "Auto-Encoder Bottleneck Features Using Deep Belief Networks", In Proceeding of IEEE International Conference on Acoustics, Speech and Signal Processing, Mar. 25, 2012, 4 pages.
Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.
Vanhoucke, et al., "Improving the Speed of Neural Networks on CPUs", In Proceedings of NIPS Workshop on Deep Learning and Unsupervised Feature Learning, Dec. 16, 2011, 8 pages.
U.S. Appl. No. 14/265,110, filed Apr. 29, 2014, entitled "Shared Hidden Layer Combination for Speech Recognition Systems".
U.S. Appl. No. 14/201,704, filed Mar. 7, 2014, entitle "Low-Footprint Adaptation and Personalization for a Deep Neural Network".
U.S. Appl. No. 14/273,100, filed May 5, 2014; entitled "Context Specific Language Model Scale Factors".
Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.
Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.
Chen, Wei, "Building Language Model on Continuous Space using Gaussian Mixture Models", In Proceedings of Research in Language Modeling, Jan. 2007, 66 pages.
Davis, et al., "Low-Rank Approximations for Conditional Feedforward Computation in Deep Neural Networks", In Proceedings of ArXiv preprint arXiv:1312.4461, Dec. 2013, 9 pages.
Deng at al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.
Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.
Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
Heck et al.; "Robustness to Telephone Handset Distortion in Speaker Recognition by Discriminative Feature Design"; In Journal of Speech Communication—Speaker Recognition and its Commercial and Forensic Applications, vol. 31, Issue 2-3; Jun. 2000, http://rmcet.com/lib/E-Journals/Speech%20Cornmunication/1-s2.0-S0167639399000771-main.pdf; 12 pgs.
Konig et al., "Nonlinear Discriminant Feature Extraction for Robust Text-Independent Speaker Recognition"; In Proceeding of the RLA2C, ESCA workshop on Speaker Recognition and its Commercial and Forensic Applications; Apr. 1998; http://www.msr-waypoint.com/pubs/193653/konig_heck_DNN.pdf; 4 pgs.
Lecouteux et al., "Dimensionality Reduction for Speech Recognition Using Neigghborhood Components Analysis"; In Proceedings of 8th Annual Conference of the International Speech Communication Association, Antwerp; Dec. 27, 2007; http://www.cs.columbia.edu/~mcollins/papers/icslp07.pdf; 4 pgs.
Lecouteux et al., "Dynamic Combination of Automatic Speech Recognition Systems by Driven Decoding"; In Journal of IEEE Transactions on Audio, Speech and Language Processing; Jan. 2013; http://hal.archives-ouvertes.fr/docs/00/75/86/26/PDF/SystemCombination.pdf; 10 pgs.
Li, et al., "Comparison of Discriminative Input and Output Transformations for Speaker Adaptation in the Hybrid NN/HMM Systems", In Proceedings of 11th Annual Conference of the International Speech Communication Association, Sep. 26, 2010, 4 pages.
Li et al., "Lattice Combination for Improved Speech Recognition"; In Proceedings of the 7th International Conference of Spoken Language Processing; Sep. 16, 2002; http://www.cs.cmu.edu/afs/cs/user/robust/www/Papers/icslp02_xiang.pdf; 4 pgs.
Liu, et al., "Use of Contexts in Language Model Interpolation and Adaptation", In Journal of Computer Speech and Language vol. 27 Issue 1, Feb. 2009, 23 pages.
Liao, Hank, "Speaker Adaptation of Context Dependent Deep Neural Networks", In IEEE international Conference on Acoustics, Speech and Signal Processing, May 26, 2013, 5 pages.
Meinedo et al., "Combination of Acoustic Models in Continuous Speech Recognition Hybrid Systems", In Proceedings of Sixth International Conference on Spoken Language Processing: Oct. 2000; http://www.inesc-id.pt/pt/indicadores/Ficheiros/416.pdf; 4 pgs.
Motlicek et al., "Feature and Score Level Combination of Subspace aussinasin LVCSR Task"; In IEEE International Conference on Acoustics, Speech and Signal Processing; May 26, 2013; http://ieeexplore.ieee.org/stamp/stamp.jsp?tp=&arnumber=6639142; 5 pgs.
Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.
Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.
Saluja, et al., "Context-aware Language Modeling for Conversational Speech Translation", In Proceedings of Machine Translation Summit XIII, Sep. 19, 2011, 8 pages.
Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.
Siniscalchi, et al., "Hermitian Based Hidden Activation Functions for Adaptation of Hybrid HMM/ANN Models", In Proceedings of 13th Annual Conference of the International Speech Communication Association, Sep. 9, 2012, 4 pages.
Su et al., "Error Back Propagation for Sequence Training of Context-Dependent Deep Networks for Conversational Speech Transcription"; In IEEE International Conference on Acoustics, Speech, and Signal Processing; May 26, 2013: http://research.microsoft.com/pubs/194345/0006664.pdf; 5 pgs.
Swietojanski et al., "Revisiting Hybrid and GMM-HMM System Combination Techniques": In Proceeding of the IEEE International Conference on Acoustics, Speech and Signal Processing; May 26, 2013; http://homepages.inf.ed.ac.uk/s1136550/data/Swietojanski_ICASSP2013.pdf; 5 pgs.
Trmal, et al., "Adaptation of a Feedforward Artificial Neural Network Using a Linear Transform", In Proceedings of in Text, Speech and Dialogue, Sep. 10 2010, pp. 8.
Xue, et al., "Restructuring of Deep Neural Network Acoustic Models with Singular Value Decomposition", In Proceedings of 14th Annual Conference of the International Speech Communication Association, Aug. 25, 2013, 5 pages.
Yan et al., "A Scalable Approach to Using DSS-Derived Features in GMM-HMM Based Acoustic Modeling for LVCSR"; In Proceeding of the 14th Annual Conference of the International Speech Communication Association; Aug. 25, 2013; http://homepages.inf.ed.ac.uk/s1136550/data/Swietojanski_ICASSP2013.pdf; 5 pgs.
Yao, et al., "Adaptation of Context-Dependent Deep Neural Networks for Automatic Speech Recognition", In IEEE Spoken Language Technology Workshop, Dec. 2, 2012, 4 pages.
Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.
Preliminary Report on Patentability dated Nov. 13, 2015 in Appln No. PCT/US2014/041023, 7 pgs.
Preliminary Report on Patentability dated Dec. 14, 2015 in Appln No. PCT/US2015/017872, 7 pgs.

(56) References Cited

OTHER PUBLICATIONS

PCT Written Opinion dated Feb. 11, 2016 in Appln No. PCT/US2015/021921, 7 pgs.
Notice of Allowance dated Dec. 15, 2015 in U.S. Appl. No. 13/923,917, 11 pgs.
Notice of Allowance dated Dec. 18, 2015 in U.S. Appl. No. 14/201,704, 15 pgs.
U.S. Official Action dated Jan. 4, 2016 in U.S. Appl. No. 13/920,323, 49 pgs.
U.S. Appl. No. 14/227,492, filed Mar. 27, 2014, entitled "Flexible Schema for Language Model Customization".
Bohus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Dos Reis Mota, Pedro Jose, "LUP: A Language Understanding Platform", A Dissertation for the Degree of Master of Information Systems and Computer Engineering, Jul. 2012, 128 pages.
Eagle, et al., "Common Sense Conversations: Understanding Casual Conversation using a Common Sense Database", In Proceedings of the Artificial Intelligence, Information Access, and Mobile Computing Workshop, Aug. 2003, 6 pages.
He et al; "What is Discriminative Learning"; Achom International; Jun. 25, 2008; 25 pgs.
Hoffmeister et al., "Log-Linear Model Combination with Word-Dependent Scaling Factors"; Human Language Technology and Pattern Recognition Computer Science Department; Sep. 6-10; Brighton UK; Copyright © 2009 ISCA; 4 pgs.
Huang et al., "Unified Stochastic Engine (USE) for Speech Recognition"; School of Computer Science; 1993 IEEE; 4 pgs.
"Integrated Development Environments for Natural Language Processing", Published on: Oct. 2001, Available at: http://www.textanalysis.com/TAI-IDE-WP.pdf; 13 pgs.
Keshtkar et al., "A Corpus-based Method for Extracting Paraphrases of Emotion Terms"; Proceedings of the NAACL HLT 2010 Workshop on Computational Appraoches to Analysis and Generation of Emotion in Text; Jun. 2010; 10 pgs.
Ko, et al., "Cammia—A Context-Aware Spoken Dialog System for Mobile Environments", In Automatic Speech Recognition and Understanding Workshop, Jul. 29, 2011, 2 pages.
Lee, et al., "Intention-Based Corrective Feedback Generationusing Context-Aware Model", In Proceedings of the Second International Conference on Computer Supported Education, Apr. 7, 2010, 8 pages.
Liu, et al., "Language Model Combination and Adaptation using Weighted Finite State Transducers", In Proceedings of IEEE International Conference on Acoustics Speech and Signal Processing, Mar. 14, 2010, 4 pages.
Moreira, et al., "Towards the Rapid Development of a Natural Language Understanding Module", In Proceedings of the 10th International Conference on Intelligent Virtual Agents, Jan. 2011, 7 pages.
Sarukkai et al., "Word Set Probability Boosting for Improved Spontaneous Dialog Recognition"; IEEE Transactions on Speech and Audio Processing, vol. 5, No. 5, Sep. 1997; 13 pgs.
Seneff, et al., "Galaxy-II: A Reference Architecture for Conversational System Development", In Proceedings of the 5th International Conference on Spoken Language Processing, Nov. 2008, 4 pages.
Sing, et al., "Domain Metric Knowledge Model for Embodied Conversation Agents", In 5th International Conference on Research, Innovation & Vision for the Future, Mar. 5, 2007, 7 pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363.
International Search Report and Written Opinion Issued in PCT Application No. PCT/US2014/041014, Mailed Date: Oct. 2, 2014, 9 Pages.
International Search Report and Written Opinion Issued in PCT Application No. PCT/US2014/041023, Mailed Date: Jun. 3, 2015, 17 Pages.
International Search Report and Written Opinion Issued in PCT Application No. PCT/US2015/017872, Mailed Date: Jun. 25, 2015, 11 Pages.
International Search Report and Written Opinion Issued in PCT Application No. PCT/US2015/029334, Mailed Date: Jul. 7, 2015, 12 Pages.
International Search Report and Written Opinion Issued in PCT Application No. PCT/US2015/021921, Mailed Date: Jul. 17, 2015, 11 Pages.
Preliminary Report on Patentability dated Sep. 15, 2015 in Appln No. PCT/US2014/041014, 6 pgs.
U.S. Official Action dated May 6, 2015 in U.S. Appl. No. 13/923,969, 12 pgs.
U.S. Official Action dated May 28, 2015 in U.S. Appl. No. 13/923,917, 18 pgs.
U.S. Official Action dated Jul. 1, 2015 in U.S. Appl. No. 14/201,704, 17 pgs.
Response dated Aug. 6, 2015 in U.S. Appl. No. 13/923,969, 7 pgs.
Response dated Aug. 7, 2015 in U.S. Appl. No. 13/923,917, 10 pgs.
U.S. Official Action dated Aug. 13, 2015 in U.S. Appl. No. 14/227,492, 41 pgs.
U.S. Official Action dated Sep. 29, 2015 in U.S. Appl. No. 13/923,917, 9 pgs.
U.S. Official Action dated Oct. 1, 2015 in U.S. Appl. No. 13/920,323, 34 pgs.
Notice of Allowance dated Oct. 1, 2015 in U.S. Appl. No. 13/923,969, 7 pgs.
Notice of Allowance dated Nov. 30, 2015 in U.S. Appl. No. 13/923,969, 12 pgs.
Kiaodong, et al., "Discriminative Learning for Speech Recognition: Theory and Practice", In Book on Discriminative Learning for Speech Recognition: Theory and Practice, Chapter 1, Aug. 12, 2008, 25 Pages.
European Official Communication in Application 14736143.0, mailed Feb. 2, 2016, 2 pgs.
European Official Communication in Application 14736140.6, mailed Jan. 28, 2016, 2 pgs.
PCT 2nd Written Opinion in International Application PCT/US2015/029334, mailed Mar. 31, 2016, 5 pgs.
Notice of Allowance dated Mar. 4, 2016 in U.S. Appl. No. 13/923,917, 5 pgs.
U.S. Appl. No. 13/923,917, Notice of Allowance mailed Mar. 21, 2016, 2 pgs.
U.S. Appl. No. 14/227,492, Amendment and Response filed Jan. 13, 2016, 13 pgs.
U.S. Appl. No. 14/227,492, Notice of Allowance mailed Apr. 19, 2016, 16 pgs.
U.S. Appl. No. 14/265,110, Amendment and Response filed Mar. 17, 2016, 17 pgs.
U.S. Appl. No. 14/201,704, Amendment after Allowance filed Feb. 24, 2016, 6 pgs.
U.S. Appl. No. 14/201,704, USPTO Response mailed Mar. 3, 2016, 2 pgs.
U.S. Appl. No. 14/273,100, Amendment and Response filed Jan. 4, 2016, 18 pgs.
U.S. Appl. No. 14/273,100, Office Action mailed Mar. 3, 2016, 19 pgs.
U.S. Appl. No. 13/923,969, Notice of Allowance mailed Feb. 18, 2016, 2 pgs.
U.S. Appl. No. 13/923,969, Amendment after Allowance filed Feb. 29, 2016, 8 pgs.
U.S. Appl. No. 13/923,969, Notice of Allowance mailed Mar. 9, 2016, 2 pgs.
U.S. Appl. No. 15/076,125, Office Action mailed May 25, 2016, 13 pages.
U.S. Appl. No. 14/273,100, Amendment and Response filed Jun. 2, 2016, 12 pages.
U.S. Appl. No. 13/923,917, Office Action mailed Jun. 30, 2016, 10 pages.

(56) References Cited

OTHER PUBLICATIONS

U.S. Appl. No. 14/227,492, Notice of Allowance mailed Aug. 4, 2016, 12 pages.
U.S. Appl. No. 14/265,110, Notice of Allowance mailed Aug. 3, 2016, 21 pages.
U.S. Appl. No. 15/076,125, Response filed Feb. 3, 2017, 3 pgs.
U.S. Appl. No. 15/076,125, Notice of Allowance mailed Feb. 21, 2017, 5 pgs.
U.S. Appl. No. 13/923,917, Notice of Allowance mailed Jan. 18, 2017, 2 pgs.
U.S. Appl. No. 13/923,917, Amendment filed Jan. 20, 2017, 6 pgs.
U.S. Appl. No. 13/923,917, USPTO Response mailed Feb. 1, 2017, 2 pgs.
U.S. Appl. No. 15/389,088, Office Action mailed Feb. 16, 2017, 17 pgs.
U.S. Appl. No. 14/273,100, Office Action mailed Jan. 30, 2017, 15 pgs.
U.S. Appl. No. 15/076,125, Amendment and Response filed Oct. 14, 2016, 11 pgs.
U.S. Appl. No. 13/923,917, Amendment and Response filed Sep. 30, 2016, 8 pgs.
U.S. Appl. No. 13/923,917, Notice of Allowance mailed Oct. 20, 2016, 7 pgs.
U.S. Appl. No. 14/227,492, Notice of Allowance mailed Oct. 14, 2016, 8 pgs.
U.S. Appl. No. 15/076,125, Office Action mailed Dec. 8, 2016, 6 pgs.
U.S. Appl. No. 14/227,492, Amendment and Response filed Nov. 4, 2016, 6 pgs.
U.S. Appl. No. 15/076,125, Notice of Allowance dated May 15, 2017, 2 pages.
U.S. Appl. No. 15/076,125, 312 Amendment dated May 19, 2017, 3 pages.
U.S. Appl. No. 15/076,125, Response to 312 Amendment dated May 31, 2017, 2 pages.
Chinese Office Action in Application 201480035401.9, dated May 15, 2017, 17 pages.
Mexican Office Action in Application MX/a/2015/017624, dated Apr. 6, 2017, 2 pages. (No English Translation).

\* cited by examiner

310

$$\begin{bmatrix} a_{11} & \cdots & a_{1n} \\ \vdots & \ddots & \vdots \\ a_{m1} & \cdots & a_{mn} \end{bmatrix} = \begin{bmatrix} u_{11} & \cdots & u_{1n} \\ \vdots & \ddots & \vdots \\ u_{m1} & \cdots & u_{mn} \end{bmatrix} \cdot \begin{bmatrix} \varepsilon_{11} & \cdots & 0 & \cdots & 0 \\ \vdots & \ddots & \vdots & \ddots & \vdots \\ 0 & \cdots & \varepsilon_{kk} & \cdots & 0 \\ \vdots & \ddots & \vdots & \ddots & \vdots \\ 0 & \cdots & 0 & \cdots & \varepsilon_{nn} \end{bmatrix} \cdot \begin{bmatrix} v_{11} & \cdots & v_{1n} \\ \vdots & \ddots & \vdots \\ v_{n1} & \cdots & v_{nn} \end{bmatrix} \quad 320$$

$$\approx \begin{bmatrix} u_{11} & \cdots & u_{1n} \\ \vdots & \ddots & \vdots \\ u_{m1} & \cdots & u_{mn} \end{bmatrix} \cdot \begin{bmatrix} \varepsilon_{11} & \cdots & 0 & \cdots & 0 \\ \vdots & \ddots & \vdots & \ddots & \vdots \\ 0 & \cdots & \varepsilon_{kk} & \cdots & 0 \\ \vdots & \ddots & \vdots & \ddots & \vdots \\ 0 & \cdots & 0 & \cdots & 0 \end{bmatrix} \cdot \begin{bmatrix} v_{11} & \cdots & v_{1n} \\ \vdots & \ddots & \vdots \\ v_{n1} & \cdots & v_{nn} \end{bmatrix} \quad 330$$

$$= \begin{bmatrix} u_{11} & \cdots & u_{1k} \\ \vdots & \ddots & \vdots \\ u_{m1} & \cdots & u_{mk} \end{bmatrix} \cdot \begin{bmatrix} \varepsilon_{11} & \cdots & 0 \\ \vdots & \ddots & \vdots \\ 0 & \cdots & \varepsilon_{kk} \end{bmatrix} \cdot \begin{bmatrix} v_{11} & \cdots & v_{1n} \\ \vdots & \ddots & \vdots \\ v_{k1} & \cdots & v_{kn} \end{bmatrix} \quad 340$$

$$= \begin{bmatrix} u_{11} & \cdots & u_{1k} \\ \vdots & \ddots & \vdots \\ u_{m1} & \cdots & u_{mk} \end{bmatrix} \cdot \begin{bmatrix} w_{11} & \cdots & w_{1n} \\ \vdots & \ddots & \vdots \\ w_{k1} & \cdots & w_{kn} \end{bmatrix} \quad 350$$

FIG. 3

Mobile Computing Device

RESTRUCTURING DEEP NEURAL NETWORK ACOUSTIC MODELS

BACKGROUND

There are many applications using speech recognition including applications for searching, command and control, spoken dialog systems, natural language understanding systems, and the like. Recently, Deep Neural Network (DNN) models being used in speech recognition applications have shown significant accuracy gains in many large vocabulary continuous speech recognition (LVCSR) tasks. However, DNN models use many more parameters and have a higher computation cost as compared to traditional systems (e.g. systems using a Gaussian Mixture Model (GMM)), which limits its deployment in many scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A Deep Neural Network (DNN) model used in context-dependent DNN Hidden-Markov-Model (CD-DNN-HMM) framework is restructured. The restructured DNN model may include a fewer number of parameters as compared to the original DNN model. Generally, weight matrices of the DNN model are reduced in size by reducing the sparseness of the matrices within the DNN model. For example, singular value decomposition (SVD) can be applied to one or more weight matrices of the DNN model to reduce the size of the DNN Model. The restructured DNN model may be tuned (e.g. using a back-propagation method) in an attempt to improve the accuracy of the restructured model.

The output layer of the DNN model may be restructured to include monophone states in addition to the senones (tied triphone states) which are included in the original DNN model. When the monophone states are included in the restructured DNN model, we use the posteriors of monophone states to select a small part of senones to be evaluated, which reduce the number of computations performed at the output layer of the restructured DNN model.

BRIEF DESCRIPTION OF THE DRAWINGS

FIG. 3 depicts decomposing a weight matrix of a DNN model into two matrices with smaller dimensions;

DETAILED DESCRIPTION

Figure 1:
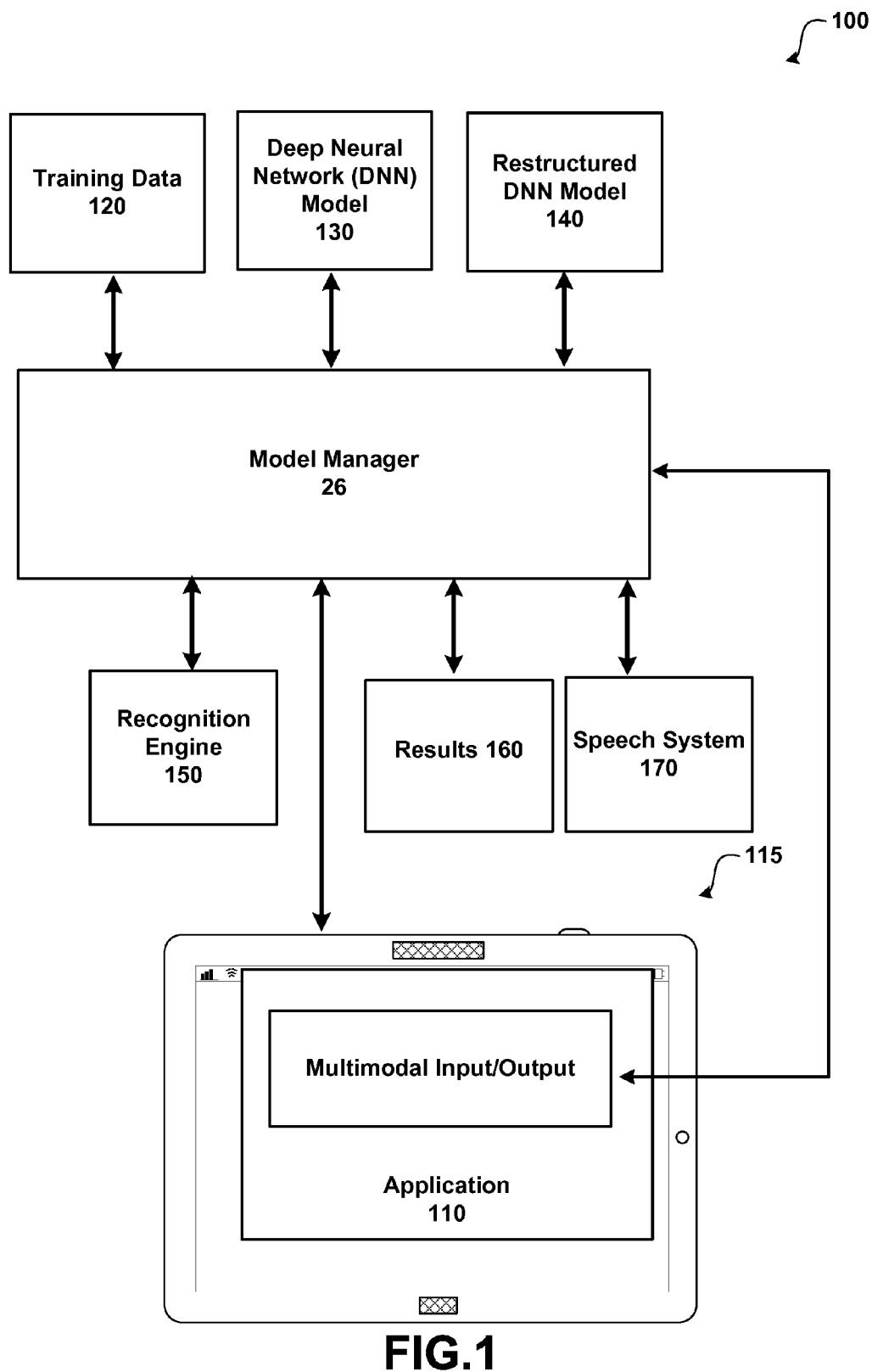
FIG. 1 shows a system for restructuring a deep neural network (DNN) model used in a speech recognition system.

Referring now to the drawings, in which like numerals represent like elements, various embodiment will be described elements, various embodiment will be described.

FIG. 1 shows a system for restructuring a deep neural network (DNN) model used in a speech recognition system.

As illustrated, system 100 includes model manager 26, training data 120, deep neural network (DNN) model 130, restructured DNN model 140, recognition engine 150, results 160, application 110 (e.g. a speech related application) and touch screen input device 115.

The use of deep neural network (DNN) models has shown accuracy improvements in many large vocabulary continuous speech recognition (LVCSR) tasks. DNN models that have not been restructured, however, use many more parameters than speech recognition systems that do not use a DNN model. Generally, processing and memory usage when using a DNN model within ASR are much larger as compared to using other models (e.g. a Gaussian Mixture Model (GMM)).

Model manager 26 accesses a Deep Neural Network (DNN) model (e.g. DNN model 130) for use in an Automatic Speech Recognition (ASR) system and creates restructured DNN model 140. DNN model 130 may be restructured to reduce the size of the model. For example, one or more weight matrices of DNN model 130 may be reduced in size by reducing the sparseness of the weight matrices. For example, model manager 26 may apply singular value decomposition (SVD) to weight matrices in DNN model 130 to reduce the size of DNN Model 130.

After restructuring DNN model 130, model manager 26 may tune restructured DNN model 140. For example, restructured DNN model 140 may be tuned by model manager 26 using a back-propagation method that is directed at improving the accuracy of the restructured DNN model 140.

A DNN model (e.g. DNN model 130 or restructured DNN model 140) may be restructured by model manager 26 to change the output layer of the DNN model to include monophone states in addition to the senones. The number of monophone states is much smaller (e.g. about 100) as compared to the number of senones (e.g. 6000). Generally, the largest number of parameters for the weight matrices of a DNN model is found in the output layer (e.g. more than 10 million parameters calculated between the senone output level and the last hidden layer of the DNN model).

Model manager 26 may be used in training a DNN model, such as DNN model 130 or restructured DNN model 140, to use monophone states in the output level. The number of parameters calculated between the monophone state output layer and the last hidden layer of the DNN model is much smaller (e.g. 0.2 million parameters (connections between 100 monophone states in the output layer to 2048 parameters in last hidden layer)) as compared to the number of parameters for the senone output layer. For example, there may be 12 million connections between the 6000 senones connected to the 2048 parameters in the last hidden layer of a DNN model. The monophone state output layer and senone output layer may be combined by model manager 26 to share the input layer and hidden layers of the DNN model.

Evaluation of a speech input (e.g. received from touch screen input device 115) using model manager 26 using either restructured DNN model 140 or DNN model 130 is performed in the same manner until the last hidden output layer in the DNN model is reached. When using the restructured DNN model 140 in evaluating the speech input, the posteriors of monophone states are calculated using the monophone state output layer by model manager 26 to select the monophones that are likely to be correct (e.g. one or more monophones having a high probability score). Generally, using Bayesian probability theory, the posteriors of the monophone states are calculated by determining the conditional probability of a monophone state taking prior information about the monophone states into account. Model manager 26 uses the selected monophone states to determine the related senones to be evaluated. Instead of calculating each of the parameters associated with the senone output layer, calculations are performed by model manager 26 for the senones that have the phone states that were selected by model manager 26 when using the monophone state output layer. The selected phone state is the central phone state for the related senone. For example, assume that the number of parameters is 12 million for a senone output layer and ten monophone states are selected by model manager 26. Instead of performing 12 million calculations in the senone output layer, 1.2 million calculations are performed by model manager 26.

The restructured DNN model 140 may be included in an ASR system. The restructured model may or may not include the monophone state output layer and may or may not include weight matrices reduced in size. For example, a restructured DNN model may include weight matrices reduced in size, another restructured DNN model may include the monophone state output layer, and another restructured DNN model may include both the reduced weight matrices and the monophone state output layer. Restructured DNN model 140 may be included in an ASR system (e.g. a Context-Dependent (CD)-DNN-Hidden-Markov-Model (HMM) ASR system).

In order to facilitate communication with the model manager 26, one or more callback routines, may be implemented. According to one embodiment, application 110 is a multimodal application that is configured to receive speech input (e.g. utterances) and to perform Automatic Speech Recognition (ASR) on the utterance. Application 110 may also receive input from a touch-sensitive input device 115 and/or other input devices. For example, voice input, keyboard input (e.g. a physical keyboard and/or SIP), video based input, and the like. Application program 110 may also provide multimodal output (e.g., for purposes of speech, graphics, vibrations, sounds, . . . ). Model manager 26 may provide information to/from application 110 in response to user input (e.g. speech/gesture). For example, a user may say a phrase to be recognized by application 110 (e.g. performing a search, selecting content, buying an item, identifying a product, . . . ). System 100 as illustrated comprises a touch screen input device 115 that detects when a touch input has been received (e.g. a finger touching or nearly teaching the touch screen). Any type of touch screen may be utilized that detects a user's touch input. More details are provided below.

Figure 2:
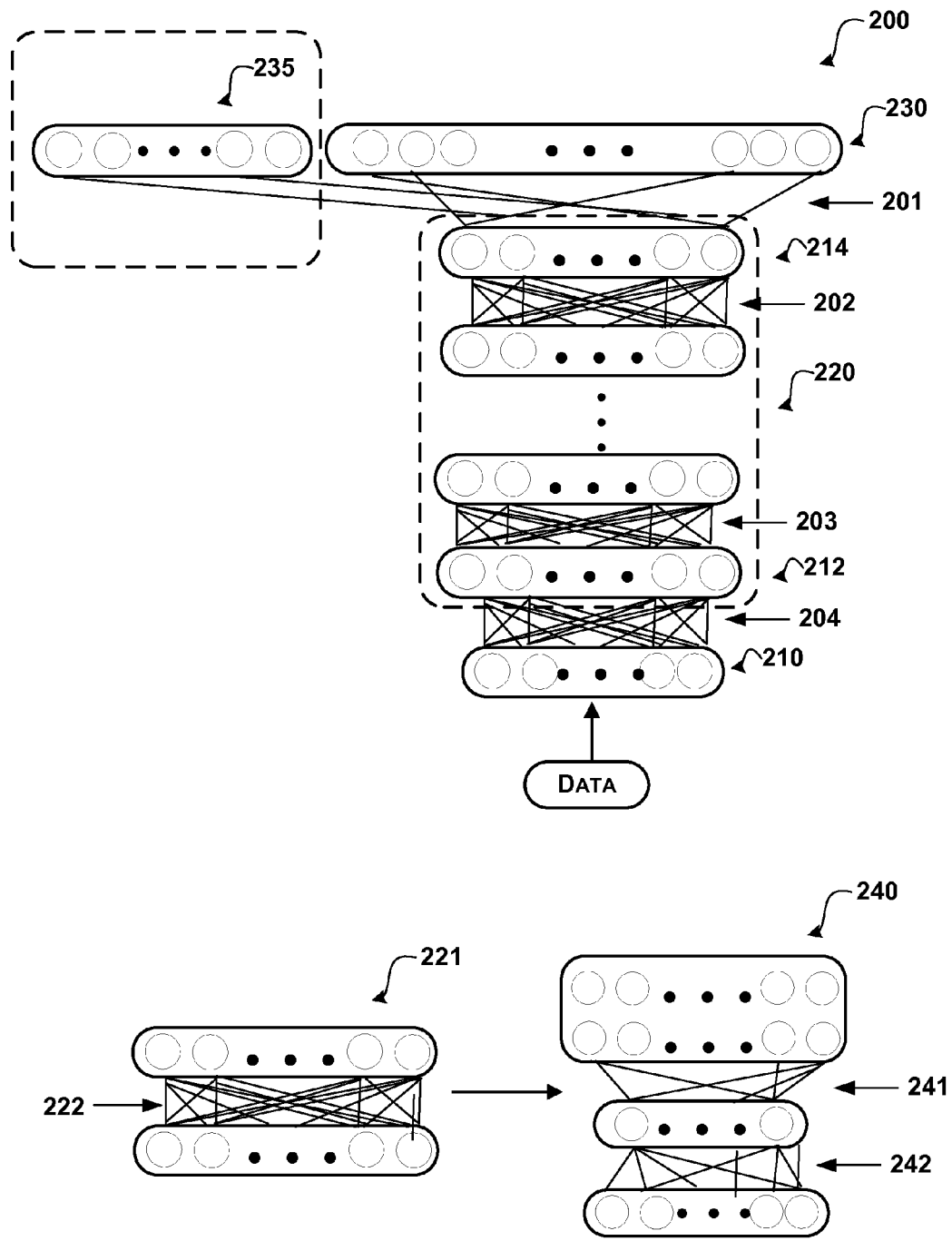
FIG. 2 shows a structure of a Deep Neural Network (DNN) and a restructured DNN output layer and restructured weight matrices.

FIG. 2 shows a structure of a Deep Neural Network (DNN) and a restructured DNN output layer and restructured weight matrices.

As illustrated, DNN model 200 includes a bottom input layer 210, hidden layers 220, and a top output layer 230. According to an embodiment, DNN model 200 includes a monophone state output layer 235 in addition to a senone output layer 230.

Generally, a DNN model is fully connected between adjacent layers (e.g. each neuron in a bottom layer is connected to each neuron in a top layer). DNNs used in ASR systems typically include 5-8 hidden layers and each layer includes thousands of neurons resulting in millions of calculations when using the DNN model for evaluating speech input. Using the same amount of training data, a DNN model typically has 2 to 10 times more parameters than traditional systems (e.g. CD-Gaussian Mixture Model (GMM)-HMMs).

As illustrated, DNN model 200 includes input layer 210 that is coupled to first hidden layer 212 using weight matrix 204 and a last hidden layer 214 that is coupled to output layer 230 using weight matrix 201. Adjacent layers between the first and last hidden layer are coupled using weight matrices (e.g. weight matrix 202, weight matrix 203, . . . ). Before DNN 200 is restructured, each weight matrix may include millions of parameters. These weight matrices are typically sparse and a large portion of the weight parameters in each weight matrix are very small (e.g. zero, or near zero in value). Generally, these very small weight parameters have a negligible effect on the output values of each layer.

According to an embodiment, singular value decomposition (SVD) is applied to decompose the weight matrices in DNN model, and then the DNN model is restructured based on the sparseness of the original format. The restructured DNN model has a similar layout as original model but replaces a single layer with two layers.

For example, original DNN model layer 221 becomes reconstructed model section 240. As can be seen, restructured model section 240 includes two extra layers as compared to the original model layer 221. After SVD restructuring, the DNN model size is reduced. The size of the reduction of the DNN model depends on a variety of factors, such as how many weight matrices are reduced and the number of Singular Values are kept after SVD decomposition. The restructured DNN model may/may not be as accurate as the original DNN model. The restructured model may be tuned (e.g. using a back-propagation method) that is directed at improving the accuracy of the restructured model.

A DNN model may also be restructured to change the output layer to include a monophone state output layer in addition to the senone output layer. Generally, the largest number of parameters for the weight matrices of a DNN model is found in the output layer (e.g. above 10 million parameters for the senone output layer to the last hidden layer). The number of parameters related to the monophone state output layer is much smaller as compared to the number of parameters for the senone output layer (e.g. 0.2 million parameters compared to 12 million parameters). The monophone state output layer and senone output layer may be combined to share the input layer and hidden layers of the DNN model.

FIG. 3 depicts decomposing a weight matrix of a DNN model into two matrices with smaller dimensions.

Weight matrix A (310) is an m×n weight matrix in a DNN model before restructuring.

Applying SVD to weight matrix A (310) produces: $A_{m \times n} = U_{m \times n} \Sigma_{n \times n} V_{n \times n}^{T}$(1) (See 320 in FIG. 3) where $\Sigma$ is a diagonal matrix with A's singular values on the diagonal in the decreasing order. The m columns of U and the n columns of V are referred to as the left-singular vectors and right-singular vectors of A, respectively. Since A is a sparse matrix, a large part of A's singular values are typically very small. Setting the small values to 0 does not considerably change the values of elements in matrix A.

Element 330 of FIG. 3 shows keeping the largest K singular values of A.

Keeping the largest k singular values of A, formula (1) may be rewritten as $A_{m \times n} = U_{m \times k} \Sigma_{k \times k} V_{k \times n}^T$ as can be seen in element 340.

This may further be represented as $A_{m \times n} = U_{m \times k} W_{k \times n}$ where $W_{k \times n} = \Sigma_{k \times k} V_{k \times n}^T$ as can be seen in element 350 that shows matrix A decomposed into two smaller matrices U and W.

As can be seen by referring to FIG. 3, the number of parameters in changes from mn in matrix A (310) to (m+n)k. The DNN model size is reduced when k is much smaller than m and n. The value of k can be set to a pre-decided value or determined using information from the weight matrices being reduced.

Figure 4:
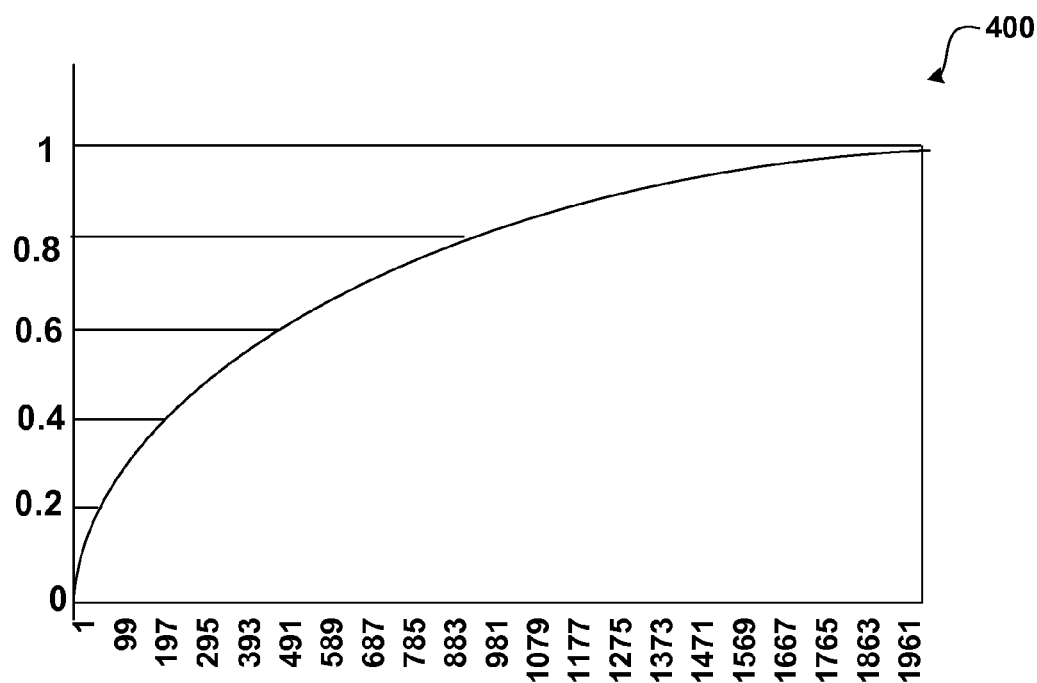
FIG. 4 illustrates a distribution of singular values for an exemplary 2048×2048 weight matrix in a 5-hidden-layer DNN.

FIG. 4 illustrates a distribution of singular values for an exemplary 2048×2048 weight matrix in a 5-hidden-layer DNN.

As illustrated, distribution 400 includes an x-axis showing the number of singular values, and a y-axis that shows an accumulated percentage of total singular values. Referring to FIG. 4 it can be seen that about 15% of singular values in a DNN model contribute 50% of total values, and around 40% of the singular values contribute 80% of total values. This illustration shows that setting the small values in a weight matrix to 0 does not considerably change the values of the elements in a weight matrix.

Figure 5:
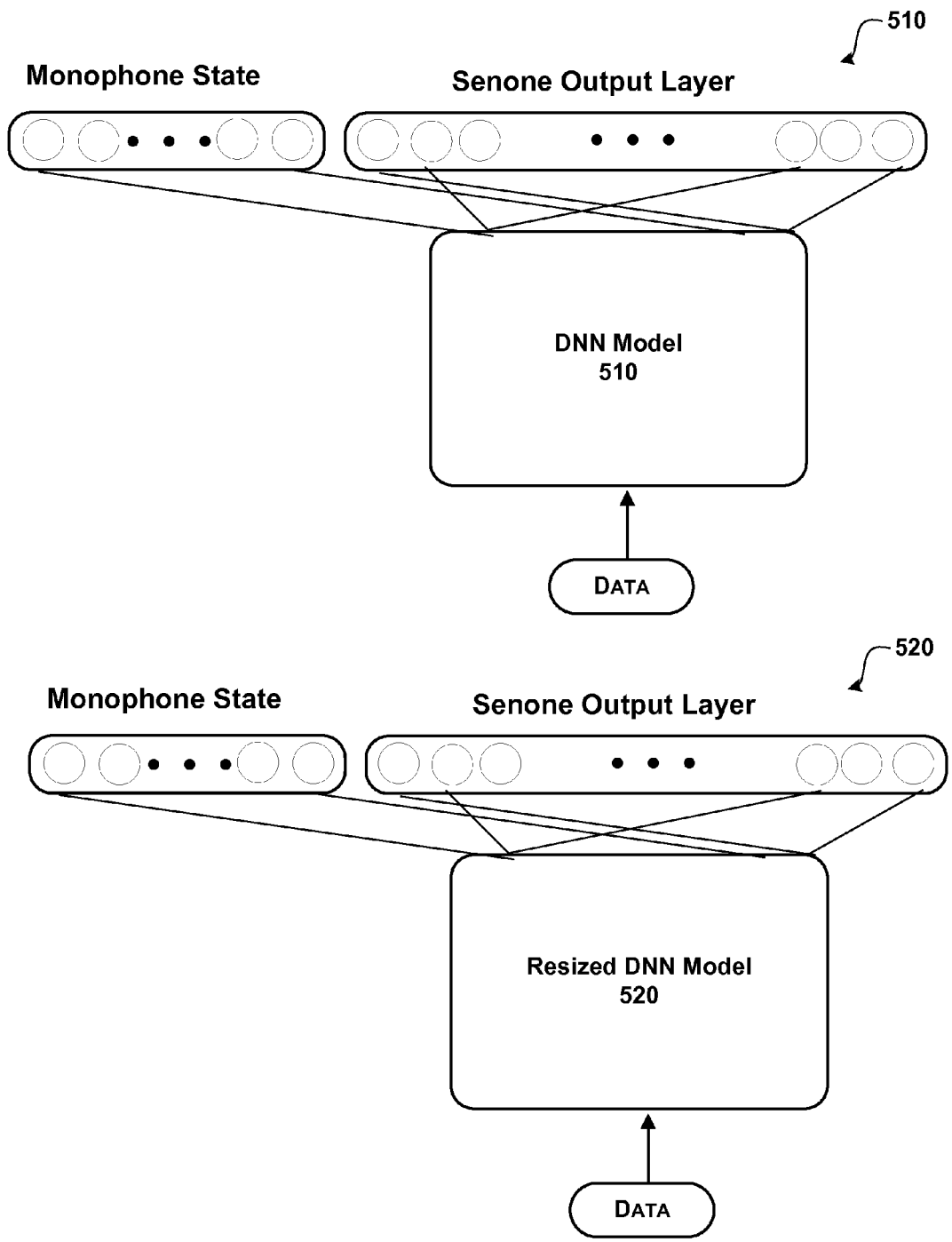
FIG. 5 shows an output layer including monophone states with other layers of the original DNN model and with a restructured DNN model.

FIG. 5 shows an output layer including monophone states with other layers of the original DNN model and with a restructured DNN model.

As illustrated, DNN model 510 shows the use of an output layer including the senone output layer and the monophone state output layer where the weight matrices of the DNN model have not been reduced in size. While DNN model 510 may include more parameters then a regular DNN model, calculations are reduced at the output layer since the monophone states are used in selecting the calculations to evaluate the senones.

DNN model 520 shows the use of the monophone states in the output layer with other layers restructured in the DNN model. DNN 520 illustrates that a DNN model can be restructured by resizing one or more weight matrices of the DNN model and adding the monophone state output layer to the DNN model.

Figure 6:
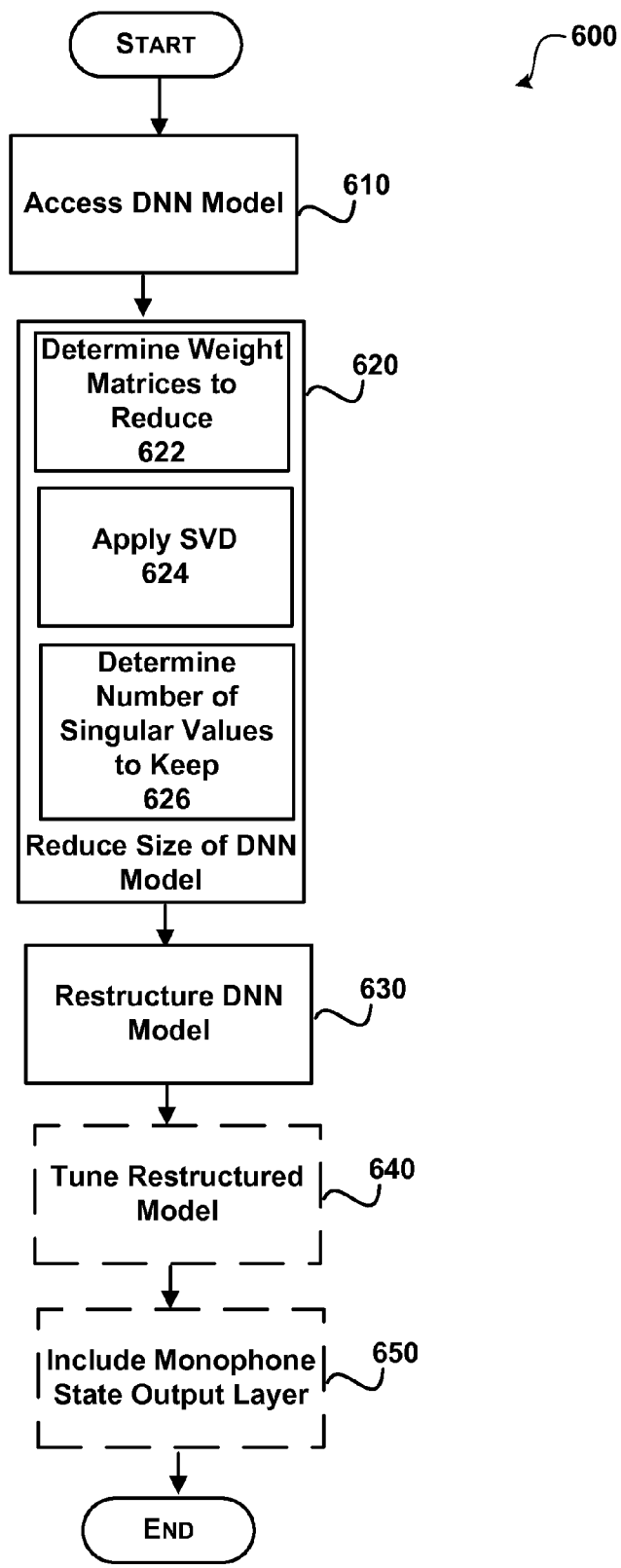
FIG. 6 shows a process for restructuring a DNN model.
Figure 7:
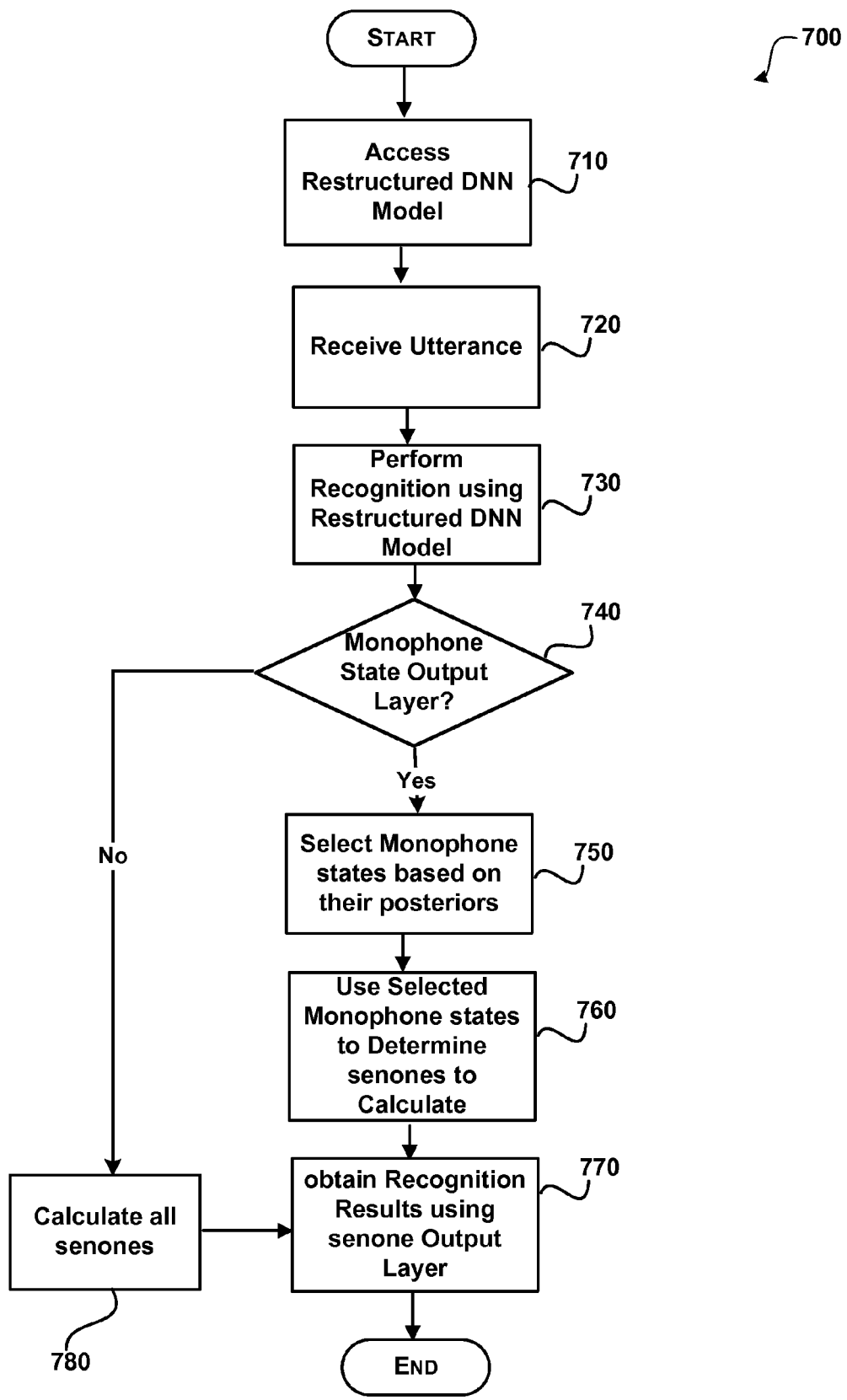
FIG. 7 illustrates a process for using a restructured DNN model.

FIGS. 6-7 illustrate restructuring a DNN model and using monophone states with a DNN model. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 6 shows a process for restructuring a DNN model.

After a start operation, the process moves to operation 610, where a DNN model is accessed. Generally, a DNN used in and ASR systems includes an input layer, 5-8 hidden layers and a senone output layer. Each layer typically includes thousands of neurons resulting in millions of calculations when evaluating the DNN model.

Flowing to operation 620, the size of the DNN model is reduced. Generally, the size of the DNN model may be reduced depends on the sparseness of one or more weight matrices between the different layers of the DNN model.

At operation 622, the weight matrices to reduce are determined. Zero or more weight matrices in the DNN may be reduced. The determination to reduce a weight matrix may be based on the size of the weight matrix. Some weight matrices in the DNN model are larger in size as compared to other weight matrices. For example, reducing the size of the weight matrix below the output layer may reduce the size of the DNN the most since that layer is typically the largest in a DNN model. Similarly, the weight matrix immediately above the input layer may not be reduced since the number of parameters in that layer is the smallest in the DNN model. According to an embodiment, each layer in the DNN model except for the input layer is reduced.

At operation 624, singular value decomposition (SVD) is applied to each weight matrix that is determined to be reduced. As discussed herein, SVD decomposes a weight matrix into different matrices.

At operation 626, a determination is made as to what singular values to keep. Generally, setting the smaller values in the weight matrix to zero does not considerably change the values of the elements. The determination of what values to keep may be made using different methods. For example, the number of the largest singular values to keep in a weight matrix may be predetermined (e.g. ½, ¼, ⅛, and the like). The number of singular values kept may change based on the weight matrix. For example, the distribution of the singular values in the weight matrices may be used to determine how many singular values to keep (e.g. keep the same proportion in each weight matrix).

Transitioning to operation 630, the DNN model is restructured. The DNN model is restructured to include two layers for each original layer.

Moving to operation 640, the restructured model may be tuned. For example, a back-propagation method that is directed at improving the accuracy of the restructured model.

Transitioning to operation 650, a monophone state output layer may be included as part of a DNN model. The number of connections between the senone output layer and the last hidden layer used in a typical DNN model is very large. For example, there may be approximately 6000 senones connected to approximately 2000 parameters making about 12 million possible connections. The number of monophone states (about 100), however, is much smaller as compared to the number of senones (about 6000) and includes about 0.2 million possible connections. According to an embodiment, the senone output layer and the monophone state output layer share the same levels within the DNN. Recognition is initially performed using the monophone state output level to assist in determining the senones to calculate thereby reducing a number of calculations performed at the output level of the restructured DNN model.

The process then moves to an end operation and returns to processing other actions.

FIG. 7 illustrates a process for using a restructured DNN model.

After a start operation, the process moves to operation 710, where a restructured DNN model is accessed. According to an embodiment, the restructured DNN model is part of a CD-DNN-HMM framework. The restructured model may be restructured in different ways. For example, zero or more weight matrices may be reduced in size and a monophone state output layer may or may not be included in the restructured DNN model. For purposes of explanation, the restructured DNN model includes one or more weight matrices reduced in size and includes a monophone state output layer.

Transitioning to operation 720, an utterance is received. The utterance may be a live utterance and/or a recorded utterance.

Flowing to operations 730, recognition of the utterance is performed using the restructured model. Use of a restructured DNN model that does not include a monophone state output layer occurs in a same manner as a traditional DNN model used in ASR.

Moving to decision operation 740, a determination is made as to whether the restructured DNN model includes a monophone state output layer. When the restructured DNN model includes a monophone state output layer, the process flows to operation 750. When the restructured DNN model does not include a monophone state output layer, the process flows to operation 780 to calculate all the senones.

At operation 750, one or more monophones are selected based on recognition results using the monophone state output layer of the restructured DNN model. The monophones may be selected using different methods. For example, a predefined number of monophones that are most likely to be correct (e.g. the top 5, 10 monophones) may be selected. According to an embodiment, the monophones that have a recognition score within a predetermined difference of the recognition score of the top monophone are selected. The number of monophones selected may be changed dynamically based on different conditions (e.g. the presence or absence of noise in the environment, quality of language model, . . . ).

Flowing to operation 760, the selected monophones are used to determine what parameters in the senone output layer to calculate. The parameters in the senone output layer that are selected include the monophones that are selected. For example, if the top 10 monophones are selected, then instead of performing all 12 million calculations in the senone output layer, 1.2 million calculations are performed.

Moving to operation 760, the recognition results using the senone output layer are received.

The process then moves to an end operation and returns to processing other actions.

Figure 8:
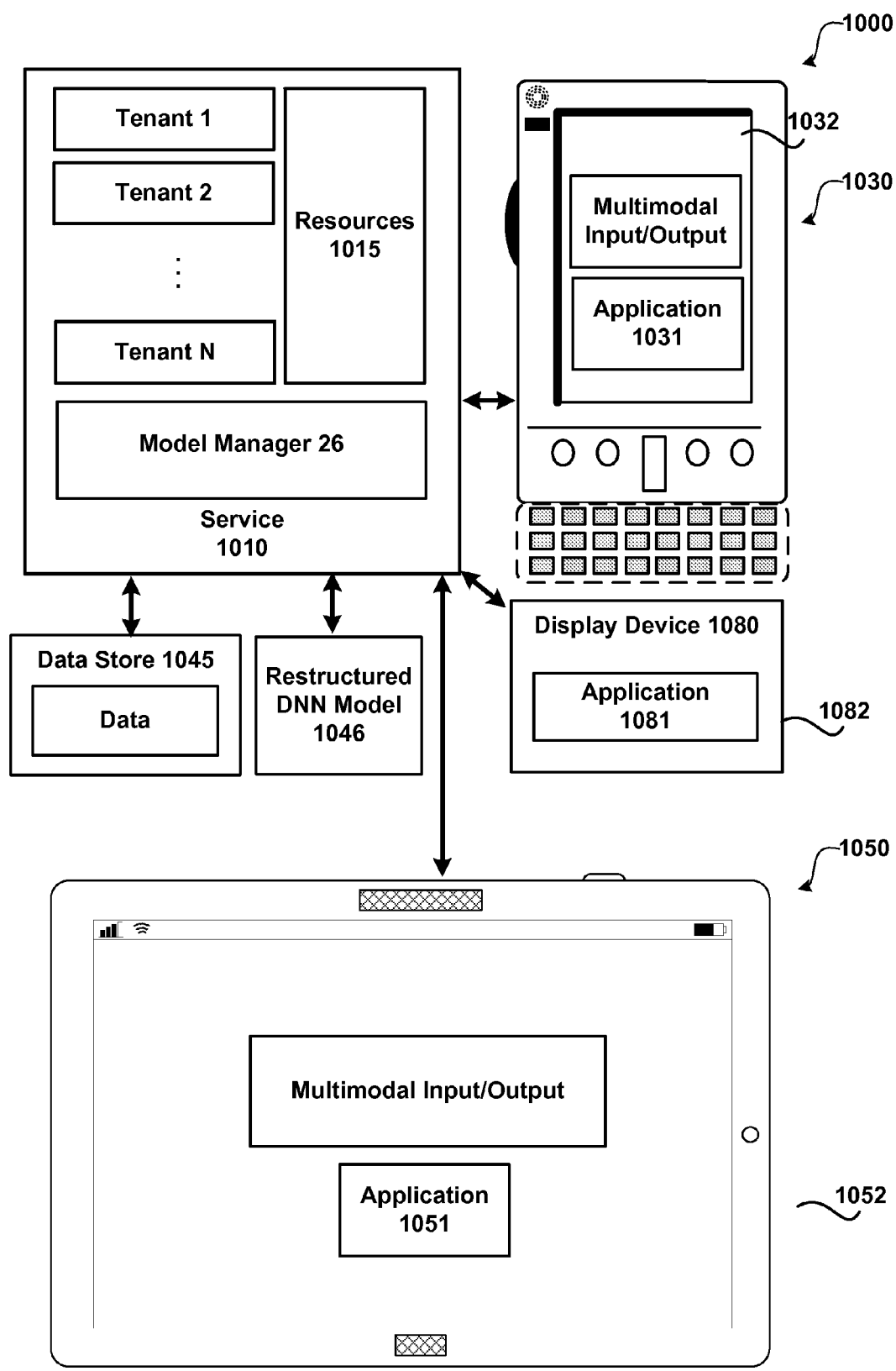
FIG. 8 illustrates an exemplary online system that may be used with a restructured DNN model.

FIG. 8 illustrates an exemplary online system that may be used with a restructured DNN model. As illustrated, system 1000 includes service 1010, data store 1045, restructured DNN model 1046, touch screen input device 1050 (e.g. a slate), smart phone 1030 and display device 1080.

As illustrated, service 1010 is a cloud based and/or enterprise based service that may be configured to provide services, such as multimodal services related to various applications (e.g. searching, games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and display device 1080 are configured with multimodal applications and each include an application (1031, 1051, 1081) that is configured to receive speech input.

As illustrated, touch screen input device 1050, smart phone 1030, and display device 1080 shows exemplary displays 1052/1032/1082 showing the use of an application using multimodal input/output. Data may be stored on a device (e.g. smart phone 1030, touch screen input device 1050 and/or at some other location (e.g. network data store 1045). Data store 1045, or some other store, may be used to store data. The applications used by the devices may be client based applications, server based applications, cloud based applications and/or some combination. According to an embodiment, display device 1080 is a device such as a MICROSOFT XBOX coupled to a display.

Model manager 26 is configured to perform operations relating to a restructuring a DNN model as described herein. For example, a DNN model may be restructured to change a sparseness of one or more weight matrices of the DNN model. A monophone state output layer may also be added to the senone output layer of a DNN model. While manager 26 is shown within service 1010, the functionality of the manager may be included in other locations (e.g. on smart phone 1030 and/or touch screen input device 1050 and/or device 1080). The restructured DNN model may be included on smart phone 1030, 1050, 1080 and used for ASR.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
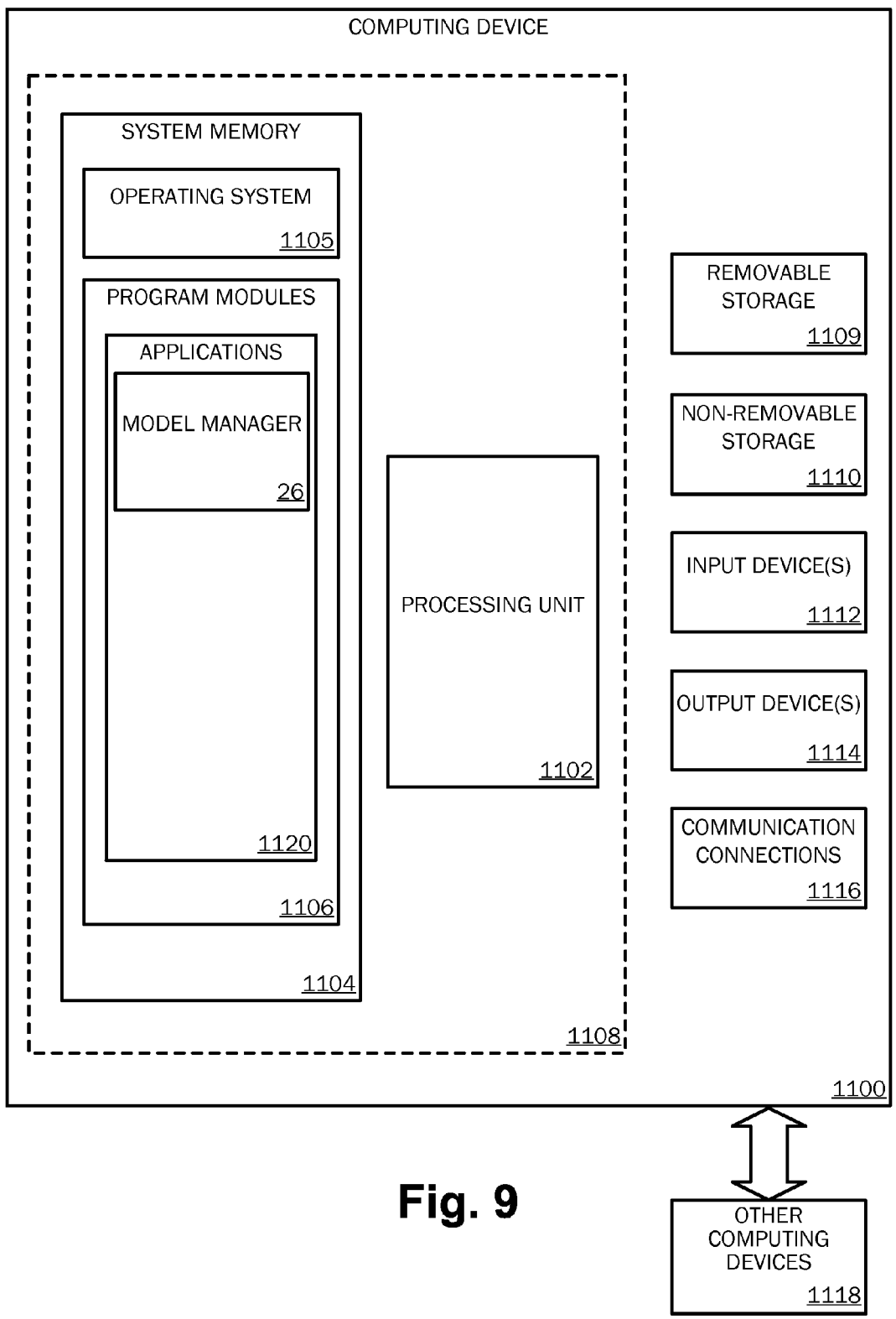
FIGS. 9, 10A, 10B, 11 and the associated descriptions provide a discussion of a variety of operating environments in which embodiments of the invention may be practiced.
Figure 10A:
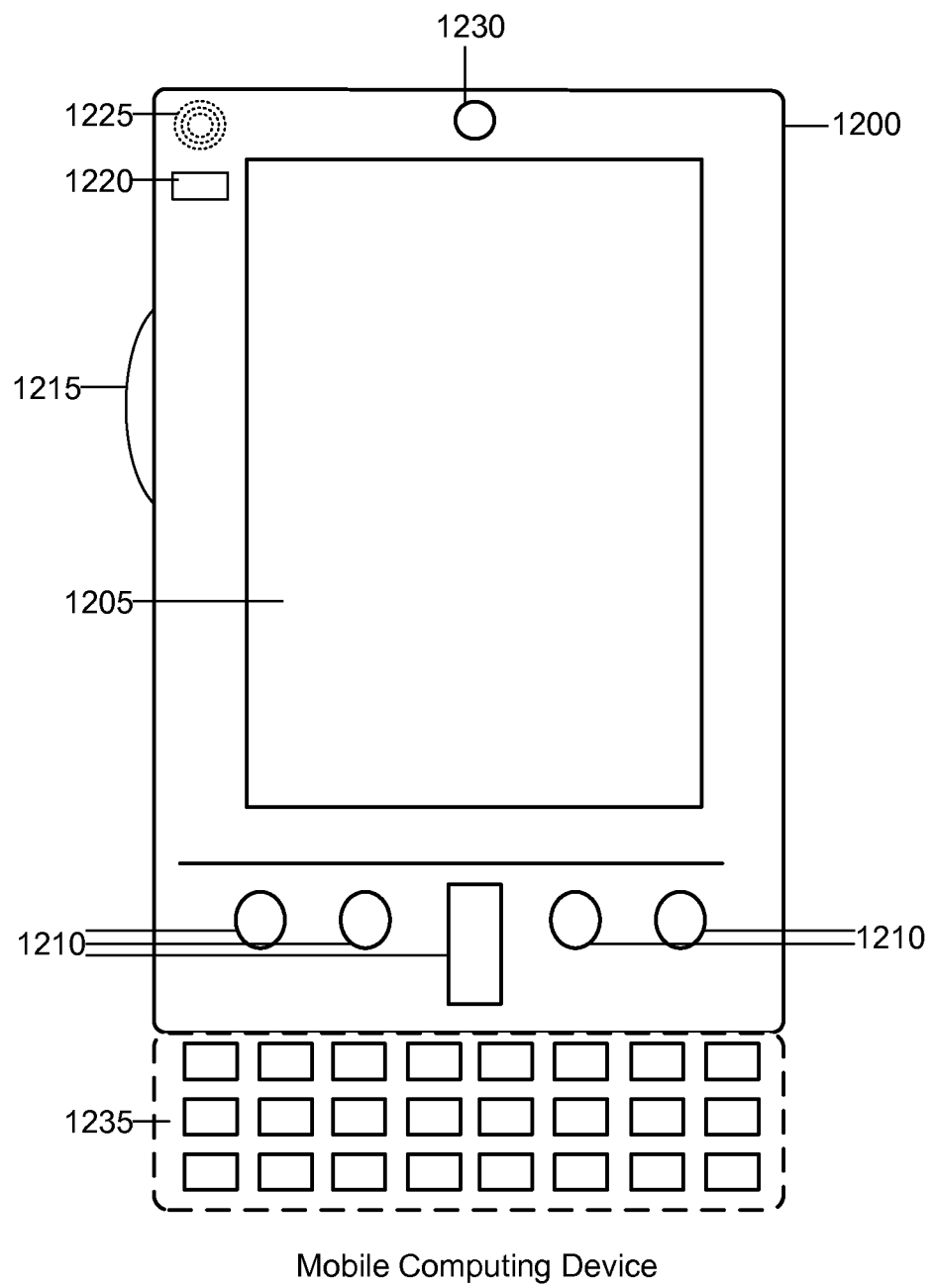
Figure 10B:
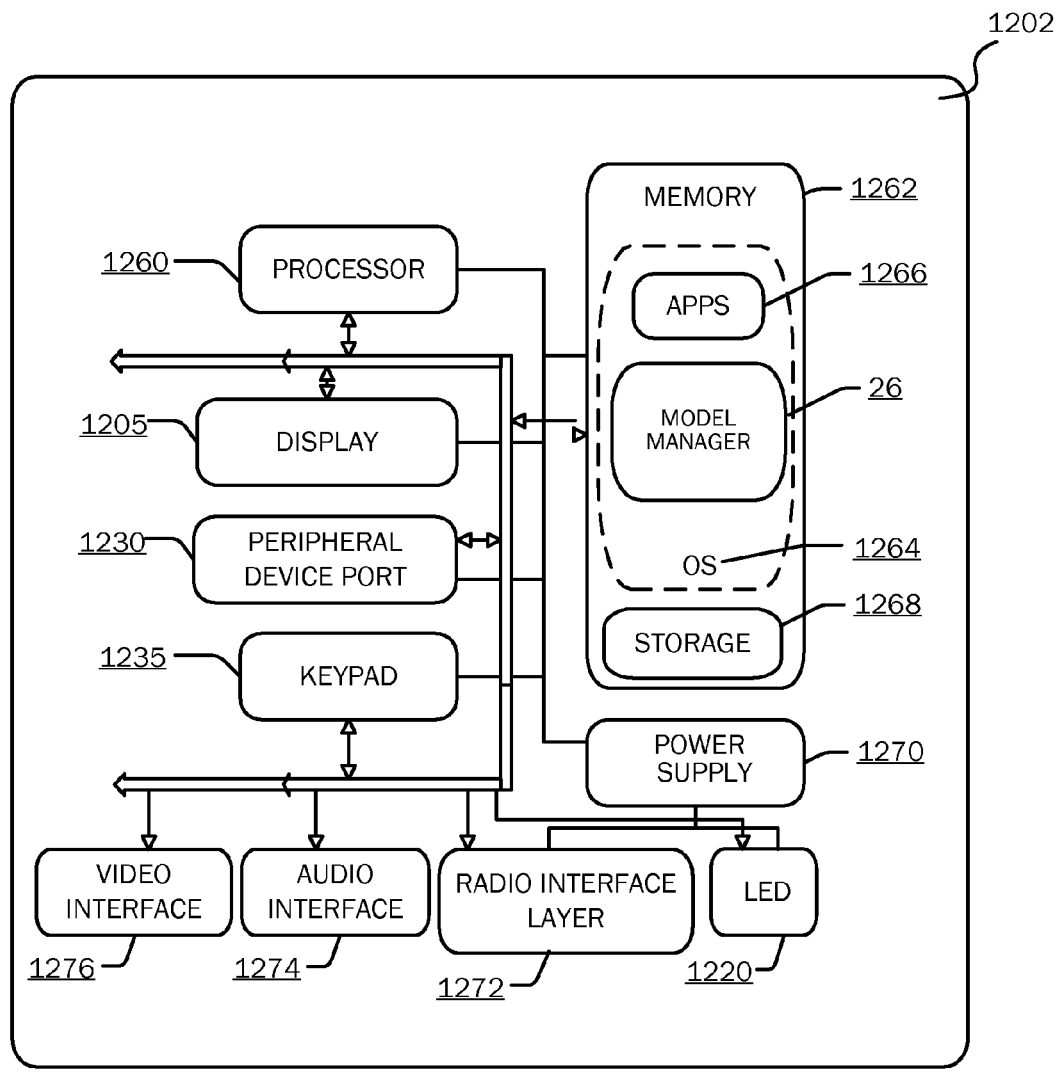
Figure 11:
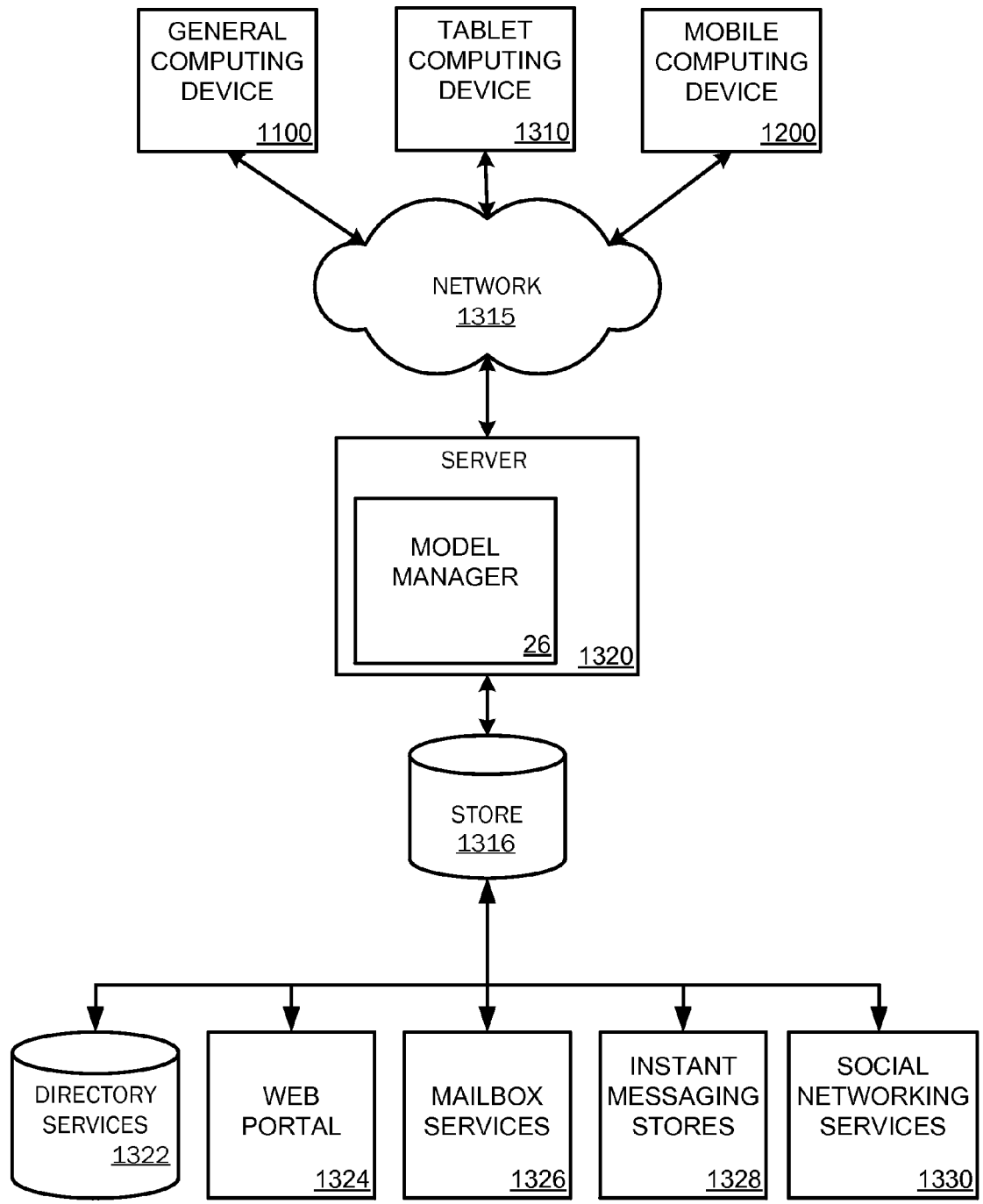

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the model manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 9 by a removable storage device 1109 and a non-removable storage device 1110.

As stated above, a number of program modules and data files may be stored in the system memory 1104. While executing on the processing unit 1102, the program modules 1106 (e.g., the model manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the model manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1200, for example, a mobile telephone, a smart phone, a tablet personal computer, a laptop computer, and the like, with which embodiments of the invention may be practiced. With reference to FIG. 10A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the model manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 10B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates an embodiment of an architecture of an exemplary system, as described above. Content developed, interacted with, or edited in association with the model manager 26 may be stored in different communication channels or other storage types. For example, various documents may be stored using a directory service 1322, a web portal 1324, a mailbox service 1326, an instant messaging store 1328, or a social networking site 1330. The model manager 26 may use any of these types of systems or the like for enabling data utilization, as described herein. A server 1320 may provide the model manager 26 to clients. As one example, the server 1320 may be a web server providing the model manager 26 over the web. The server 1320 may provide the model manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method comprising:
accessing a Deep Neural Network (DNN) model that includes a weight matrix and layers comprising:
an input layer;
a first hidden layer;
a second hidden layer, wherein the first and second hidden layers are coupled by the weight matrix comprising a plurality of values; and
an output layer;
determining whether the weight matrix is a weight matrix having at least as many parameters as a weight matrix immediately preceding the output layer;
upon determining that the weight matrix has at least as many parameters as a weight matrix immediately preceding the output layer, reducing a sparseness of the weight matrix in the DNN model, wherein reducing the sparseness comprises executing decomposition processing of the weight matrix to generate two smaller matrices from the weight matrix, wherein the decomposition processing comprises applying Singular Value Decomposition (SVD) to the weight matrix;
restructuring the DNN model based on the executed decomposition processing, wherein the restructuring further comprises modifying the plurality of values coupling the first and second hidden layers of the DNN model by replacing the weight matrix with the two smaller matrices;
providing the restructured DNN model;
receiving an utterance; and
processing the received utterance using the restructured DNN model.

2. The method of claim 1, wherein restructuring the DNN model with the weight matrix reduced in sparseness comprises splitting a layer in the DNN model into at least two smaller layers.

3. The method of claim 1, wherein the restructuring further comprises replacing, in at least one layer of the DNN model, the weight matrix with the at least two smaller matrices.

4. The method of claim 1, wherein the output layer comprises a senone output layer and a monophone state output layer.

5. The method of claim 1, further comprising training the output layer of the DNN to use a monophone state.

6. The method of claim 1, further comprising tuning the restructured model using a back-propagation method.

7. A computer storage device storing computer-executable instructions that, when executed by at least one processor, perform a method comprising:
creating a restructured Deep Neural Network (DNN) model from an original DNN model, wherein the creating further comprises:
accessing the original DNN model, the original DNN model including a weight matrix and layers comprising:
an input layer;
a first hidden layer;
a second hidden layer, wherein the first and second hidden layers are coupled by the weight matrix comprising a plurality of values; and
an output layer
determining whether the weight matrix is a weight matrix having at least as many parameters as a weight matrix immediately preceding the output layer;
upon determining that the weight matrix has at least as many parameters as a weight matrix immediately preceding the output layer, executing decomposition processing of the weight matrix of the original DNN model to generate two smaller matrices from the weight matrix, wherein the decomposition processing comprises applying Singular Value Decomposition (SVD) to the weight matrix; and
restructuring the original DNN model based on the executed decomposition processing, wherein the restructuring further comprises modifying the plurality of values coupling the first and second hidden layers of the DNN model by replacing the weight matrix with the two smaller matrices;

receiving an utterance; and using the restructured DNN model to recognize the received utterance.

8. The computer storage device of claim 7, wherein a sparseness of the weight matrix in the original DNN is reduced in the restructured DNN model.

9. The computer storage device of claim 7, wherein the output layer of the restructured DNN comprises a monophone state output layer and a senone output layer.

10. The computer storage device of claim 9, further comprising using posteriors of monophone states to select senones to be evaluated to reduce the number of calculations in the senone output layer.

11. The computer storage device of claim 7, wherein the restructured DNN model comprises at least one additional layer as compared with the original DNN model.

12. The computer storage device of claim 7, further comprising tuning the restructured DNN model by executing a back-propagation method before using the restructured DNN model.

13. A system comprising:
a processor and memory;
an operating environment executing using the processor; and
a model manager that is configured to perform actions comprising:
  accessing a Deep Neural Network (DNN) model that includes a weight matrix and layers comprising:
    an input layer;
    a first hidden layer;
    a second hidden layer, wherein the first and second hidden layers are coupled by the weight matrix comprising plurality of values; and
    an output layer;
  determining whether the weight matrix is a weight matrix having at least as many parameters as a weight matrix immediately preceding the output layer;
  upon determining that the weight matrix has at least as many parameters as a weight matrix immediately preceding the output layer, reducing a sparseness of the weight matrix in the DNN model, wherein reducing the sparseness comprises executing decomposition processing of the weight matrix to generate two smaller matrices from the weight matrix, wherein the decomposition processing comprises applying Singular Value Decomposition (SVD) to the weight matrix;
  restructuring the DNN model based on the executed decomposition processing, wherein the restructuring further comprises modifying the plurality of values coupling the first and second hidden layers of the DNN model by replacing the weight matrix with the two smaller matrices;
  providing the restructured DNN model;
  receiving an utterance; and
  processing the received utterance using the restructured DNN model.

14. The system of claim 13, wherein restructuring the DNN model with the weight matrix reduced in sparseness comprises splitting one of the layers in the DNN model into at least two smaller layers.

15. The system of claim 13, wherein the output layer comprises a senone output layer and a monophone state output layer.

16. The system of claim 13, further comprising training the output layer of the DNN to use a monophone state.

17. The method of claim 1, wherein the weight matrix is automatically reduced if it is a weight matrix immediately preceding the output layer.

18. The system of claim 13, wherein the weight matrix is automatically reduced if it is a weight matrix immediately preceding the output layer.

19. The computer storage device of claim 7, wherein the instructions are further executable by the at least one processor for automatically reducing the weight matrix if it is a weight matrix immediately preceding the output layer.

20. The system of claim 13, wherein the model manager is further configured to tune the restructured DNN model by executing a back-propagation method before using the restructured DNN model.

* * * * *